Feb. 19, 1924. 1,484,403
J. MILLER
FLOWERPOT HOLDER
Filed June 14, 1922

Inventor
J. Miller
By Robb, Robb & Hill
Attorneys

Patented Feb. 19, 1924.

1,484,403

UNITED STATES PATENT OFFICE.

JANNETTE MILLER, OF EAU CLAIRE, WISCONSIN.

FLOWERPOT HOLDER.

Application filed June 14, 1922. Serial No. 568,268.

*To all whom it may concern:*

Be it known that I, JANNETTE MILLER, a citizen of the United States, residing at Eau Claire, in the county of Eau Claire and State of Wisconsin, have invented certain new and useful Improvements in Flowerpot Holders, of which the following is a specification.

The present invention relates to a holder for flower pots and other containers of a similar character from which drippings are given off at times in such a manner as to cause discolorization or damage to adjacent furniture or fixtures.

Among the objects of the invention is to provide a holder of this character which will receive and support the flower pot whether the latter is suspended from an overhead support or resting upon a table or the like, and which provides novel means for collecting any water or moisture which may drain from the flower pot and holding the said water in such a manner that it can be readily removed without disturbing the flower pot and plant.

Further objects of the invention are to provide a flower pot holder which is comparatively simple and inexpensive in its construction, which can be constructed to receive either a single flower pot or a group of flower pots, and which will enable growing plants to be kept in the house or on the porch without danger of the furniture or house fittings being discolored or injured by drippings occasioned by drainage from the flower pots when the plants are watered.

For the purpose of illustrating the general idea of the invention, two particular embodiments thereof will be shown and described in detail, although it will be understood that many modifications and changes can be made in the details of construction, without departing from the spirit of the invention and the scope of the claims.

For a full understanding of the invention reference is to be had to the following description and accompanying drawings, in which.

Corresponding and like parts are referred to in the following description and indicated on all of the views of the drawings by like reference characters.

Figure 1:
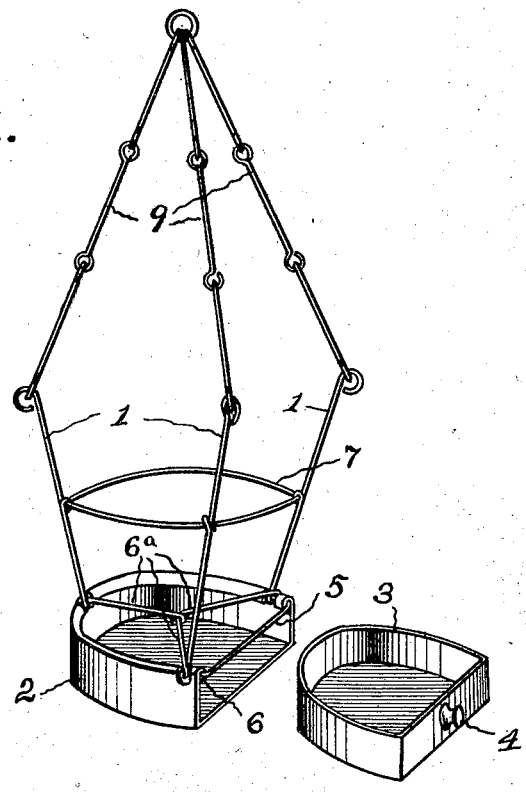
Figure 1 is a perspective view of a flower pot holder which is constructed in accordance with the invention, and which is designed for use when the plant is to be suspended from an over-head support and hung up in the manner of a hanging basket, the tray within which the drainage water collects being shown as withdrawn from the box or casing in the bottom of the support.

Referring to the drawings, the numerals 1 designate a series of arms which may be formed of wire or other suitable material, and which extend upwardly from the sides of a box or casing 2, which is adapted to be arranged under the flower pot and to receive the removable tray 3 within which the drippings or drainage from the flower pot is collected. The box 2 is open at the top and at one side thereof; and may be conveniently formed of sheet metal or other suitable material. The tray 3 is of substantially the same size and configuration as the box 2 and is removable through the open side of the box, being provided with a suitable handle or finger piece 4, by means of which it can be grasped when being placed in position or removed therefrom. The tray is intended to be formed of some suitable material such as sheet metal, and is of a water tight construction, so that it will receive and hold the water draining from the flower pot until such time as it may be convenient to remove the tray and empty the same.

In the form of the invention which has been illustrated, a reinforcing wire 5 extends around the upper edge of the box 2, and the upper edges of the side walls of the box are returned around this wire ring, as indicated at 6. This reinforcing ring is arranged above the tray 3 and connected to the upper edges of the side walls of the box at the open side thereof, thereby tending to stiffen and reinforce the same.

The lower ends of the upstanding arms 1 are coiled around or otherwise secured to the reinforcing ring 5, and then extended inwardly toward the center of the box, as indicated at 6ª. These portions 6ª of the wires form a skeleton support for the lower end of the flower pot A and prevent the flower pot from dropping down into the box and tray. It is thus assured that the tray can be removed at any time without disturbing the flower pot.

At intermediate points in their length the upstanding arms 1 are connected by a ring or band 7 which encircles the flower pot and assists in holding the arms in proper position. The upstanding arms may be caused to engage the flower pot to hold the same in proper position, and the upper extremities thereof may terminate in loops 8 to which link or chain members 9 are connected, said link members, as indicated by Figure 1, enabling the holder to be suspended from an overhead support and used in the manner of a hanging basket.

Figure 2:
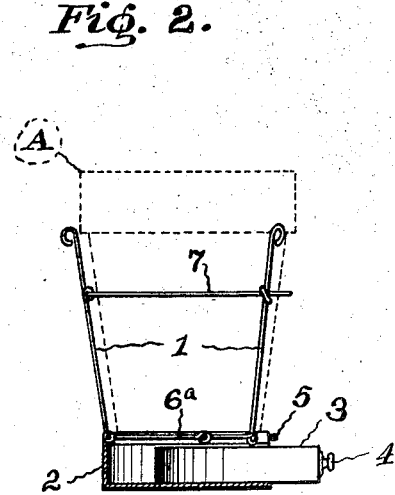
Figure 2 is a side elevation of one of the devices which is used as a stand when the plant is to be placed on a table or like support.

Figure 2 illustrates the manner of using the device when the link or chain members 9 are omitted, and it is desired to support the plant on a table or like member. The box 2 then rests upon the table or support and the flower pot A is supported above the box by means of the skeleton frame provided by the upstanding arms 1 and encircling ring 7. The flower pot support can be used in either manner, and the tray 3 within which the drainage or drippings collect can be removed and emptied at any time, without disturbing the flower pot and plant. Where the drainage and drippings are thus collected it is possible to keep plants in or around the house without danger of the furniture or house fittings being discolored or injured by reason of water dripping from the flower pots.

Figure 3:
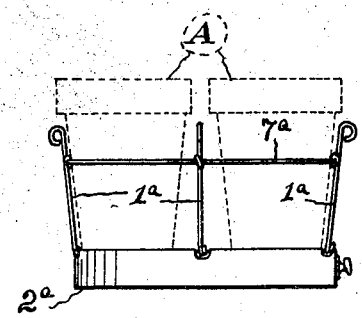
Figure 3 is a diagrammatic view showing a slight modification in which the flower pot support is constructed to receive a group of flower pots.

A slight modification is shown by Figure 3, in which the box 2ª is made of sufficient size to extend under a group of flower pots A. The removable tray would be of a corresponding size so as to receive the drainage from all of the flower pots of the group. A suitable number of arms 1ª project upwardly from the sides of the box, being connected by a ring 7ª which encircles the flower pots and assists in holding the same in position. The general construction remains the same, although the device is enlarged to receive a plurality of flower pots.

Having thus described my invention, what I claim as new and desire to secure by Letters Patent is,

1. A holder for flower pots and the like, including a box, upstanding wire arms projecting from the box, connecting means between the upstanding arms to provide a skeleton frame to receive a flower pot, wires extending transversely across the top of the box to support the flower pot, and a tray slidably mounted within the box to receive the drainage of the flower pot, said tray being removable independently of the flower pot.

2. A holder for flower pots and the like, including a box, a series of upstanding wire arms projecting upwardly from the box, integral extensions at the lower ends of the wire arms which extend across the top of the box and are connected to provide a skeleton supporting frame, connecting members between the upstanding arms and cooperating therewith to provide a positioning frame for a flower pot, and a tray slidably mounted within the box and adapted to receive the drainage of the flower pot, said tray being removable independently of the flower pot.

3. A holder for flower pots and the like, including a box, a reinforcing member at the top of the box, a skeleton support extending across the top of the box and connected to the reinforcing member, a positioning frame connected to the reinforcing member and extending upwardly from the box to receive the flower pot, and a tray arranged within the box to receive the drainage of the flower pot, said tray being removable independently of the flower pot.

4. A holder for flower pots and the like, including a box, a reinforcing wire extending around the upper edge of the box, a series of upstanding arms having the lower ends thereof secured to the reinforcing wire and formed with extensions which extend across the top of the box and are connected to provide a supporting frame, connecting members between the upstanding arms and cooperating therewith to provide a positioning frame for the flower pot, and a tray fitted within the box to receive the drainage of the flower pot, said tray being removable independently of the flower pot.

In testimony whereof I affix my signature.

JANNETTE MILLER.